(No Model.)
C. KEHR.
WHEEL TIRE.
No. 517,416. Patented Mar. 27, 1894.
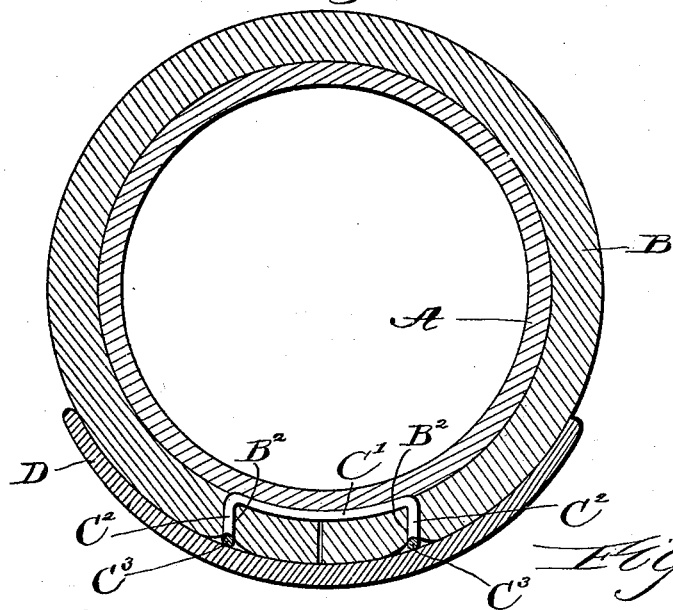
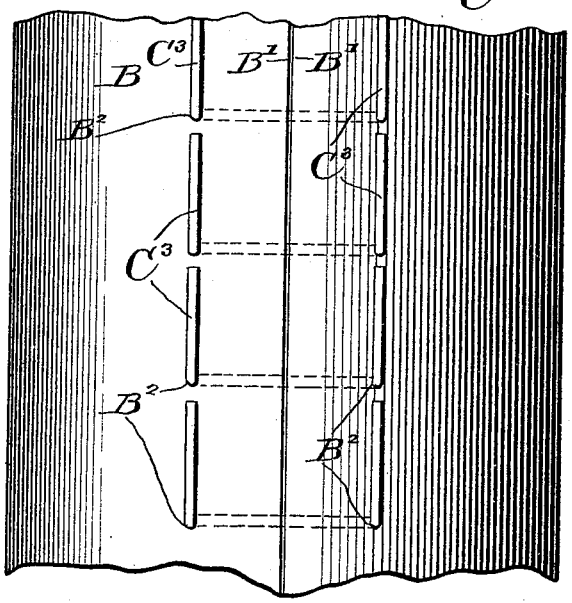
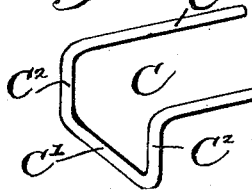
Witnesses:
Alice Lines
Ambrose Risdon
Inventor:
Cyrus Kehr

UNITED STATES PATENT OFFICE.

CYRUS KEHR, OF LAKE SIDE, ILLINOIS.

WHEEL-TIRE.

SPECIFICATION forming part of Letters Patent No. 517,416, dated March 27, 1894.

Application filed July 6, 1893. Serial No. 479,705. (No model.)

*To all whom it may concern:*

Be it known that I, CYRUS KEHR, a citizen of the United States, residing at Lake Side, in the county of Cook and State of Illinois, have invented certain new and useful Improvements in Wheel-Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my invention is to produce a convenient means for joining the edges of a pneumatic tire where it is slotted.

In the accompanying drawings: Figure 1 is a transverse section. Fig. 2 is a view of the seat of the tire. Fig. 3 is a perspective of one of the yokes.

A is the inner tube of the tire.

B is the outer tube.

The construction and use of these tubes are so well known that I deem it unnecessary to describe them at length.

D is the rim of the wheel. This is of the ordinary concave form and of proper size to receive the seat portion of the tire. Along the middle line of the seat portion of the tire, the outer tube, B, is slotted in one or more places or all around the tire to afford means for inserting and taking out the inner tube, A. The edges, B', are held together by means of the yokes, C. These yokes may be formed of wire of suitable strength. Each of said yokes consists of a substantially straight connecting part, C', shanks, $C^2$, extending parallel to each other and at right angles to the connecting parts, C', and arms, $C^3$, extending at right angles to said shanks and parallel to each other and in planes to which the connecting part, C', is perpendicular. The edges, B', of the outer tube, B, are provided with opposite perforations, $B^2$, the space from one perforation to the other in the same edge being preferably a little more than the length of the arms, $C^3$, and the distance from any one of the perforations, $B^2$, to the corresponding perforation in the opposite edge being equal to and preferably a little greater than the length of the connecting part, C'. The length of the shanks, $C^2$, should equal substantially the thickness of the wall of the tube, B.

The yokes are put into place by passing the arms, $C^3$, and shanks, $C^2$, from the inside of the tube, B, through opposite perforations, $B^2$, until the connecting part, C', is drawn against the inner surface of the wall of the tube, B. Then the yoke will be so rotated upon the shanks, $C^2$, as to bring the arms, $C^3$, toward and in contact with the outer surface of the tube, B. When all of the yokes, C, have been thus put into place in the tire, the latter is drawn over and into the rim, D. This brings the arms, $C^3$, into contact with said rim, and the latter brings said arms into contact with the outer surface of the wall of the tube, B, and keeps said arms in such position until the tire is again removed from the wheel. When the tire is inflated, the strain is upon the shanks, $C^2$, $C^2$, and from the latter upon the connecting part, C'.

I claim as my invention—

1. The combination with the tube, B, of a pneumatic tire which is slotted and has perforations as herein described, of yokes, C, having connecting parts, C', shanks, $C^2$, and arms, $C^3$, substantially as described.

2. The combination with the tube, B, of a pneumatic tire which is slotted and has perforations as herein described, of yokes, C, having connecting parts, C', shanks, $C^2$, arms, $C^3$, and a wheel rim, substantially as described.

In testimony whereof I affix my signature, in presence of two witnesses, this 19th day of June, 1893.

CYRUS KEHR.

Witnesses:
ALICE LINEE,
AMBROSE RISDON.